July 22, 1958     T. G. PRESCOTT     2,844,751
ELECTRODE STRUCTURE FOR GASEOUS DISCHARGE DEVICES
Filed Sept. 8, 1953     4 Sheets-Sheet 1

FIG. I

INVENTOR.
THOMAS G. PRESCOTT
BY
ATTORNEY

July 22, 1958  T. G. PRESCOTT  2,844,751
ELECTRODE STRUCTURE FOR GASEOUS DISCHARGE DEVICES
Filed Sept. 8, 1953  4 Sheets-Sheet 2

INVENTOR.
THOMAS G. PRESCOTT
BY
ATTORNEY

*INVENTOR.*
THOMAS G. PRESCOTT
BY

ATTORNEY

United States Patent Office 2,844,751
Patented July 22, 1958

2,844,751

ELECTRODE STRUCTURE FOR GASEOUS DISCHARGE DEVICES

Thomas G. Prescott, Beverly, Mass., assignor to Bomac Laboratories Inc., Beverly, Mass., a corporation of Massachusetts Application September 8, 1953, Serial No. 378,798

1 Claim. (Cl. 313—217)

The present invention relates generally to gaseous discharge devices and, more particularly, to electrode structure for cell type transmit receive tubes adapted for mounting in resonant cavities.

Transmit receive tubes are employed in radar systems to permit the use of a common antenna for transmitting and receiving. Such devices when coupled in a resonant circuit provide for a gaseous discharge when the transmitted energy reaches a predetermined power level. The returning reflected energy, however, is below the level necessary to initiate a discharge, and the weak signals will be permitted to pass to the sensitive receiver.

Earlier embodiments of transmit receive tubes, or the commonly referred to TR box, provided conical electrodes forming a discharge gap and an ionizable atmosphere having the desired breakdown voltage potential. The discharge gap structure was hermetically sealed in an atmosphere enclosing member, desirably a low loss glass, with the flanges of the electrodes sealed to the glass to accurately position the electrodes. A portion of the electrode flanges extends beyond the glass to make contact with a resonant cavity to thereby complete the resonant circuit. Tuning of the complete assembly was possible by altering the spacing of th electrodes by means of a differential screw mechanism axially moving one of the electrodes.

Continued use of the aforementioned devices, particularly in L-band and S-band radar systems having frequencies of from 1000 to 5000 megacycles, have pointed out certain short comings in present designs. Adjustments in gap spacings below approximately .005" cannot be attained precisely because of the proximity and alignment of the electrodes, together with the inherent backlash of the tuning mechanism. Thus, it has been found to be impossible to tune gradually at the lower frequencies where the gap dimensions are extremely narrow and critical.

It is accordingly an object of the present invention to provide an improved cell type transmit receive tube having a more efficient tuning range.

It is another object to provide a transmit receive tube covering a wider tuning range without altering any of the external dimensions of the tube.

A further object is to provide a cell type transmit receive tube having improved discharge gap structure to permit gradual tuning to a lower frequency range where gap spacings are extremely critical. Briefly, the invention attains the objects enumerated above by increasing the capacity of the discharge gap when the tuning electrode is in close proximity to the fixed electrode. A substantially spherical extension on the normally flat tipped tunable electrode is provided with dimensions which allow this extension to penetrate the field of the open tip fixed electrode. An increased capacity of approximately 8 micro-micro-farads is attainable below one turn of the tuning mechanism. In terms of frequency, this additional capacity results in a tuning curve having a slope of 115 megacycles per turn as opposed to 500 megacycles per turn for gap spacings below .005" in existing tube types. Since the closer gap spacings are necessary to tune to the lower frequencies, more precise tuning and improved performance is possible by the change in slope of the tuning curve.

The invention will now be described in detail by referring to the following specification and appended drawings, in which.

Figure 1:
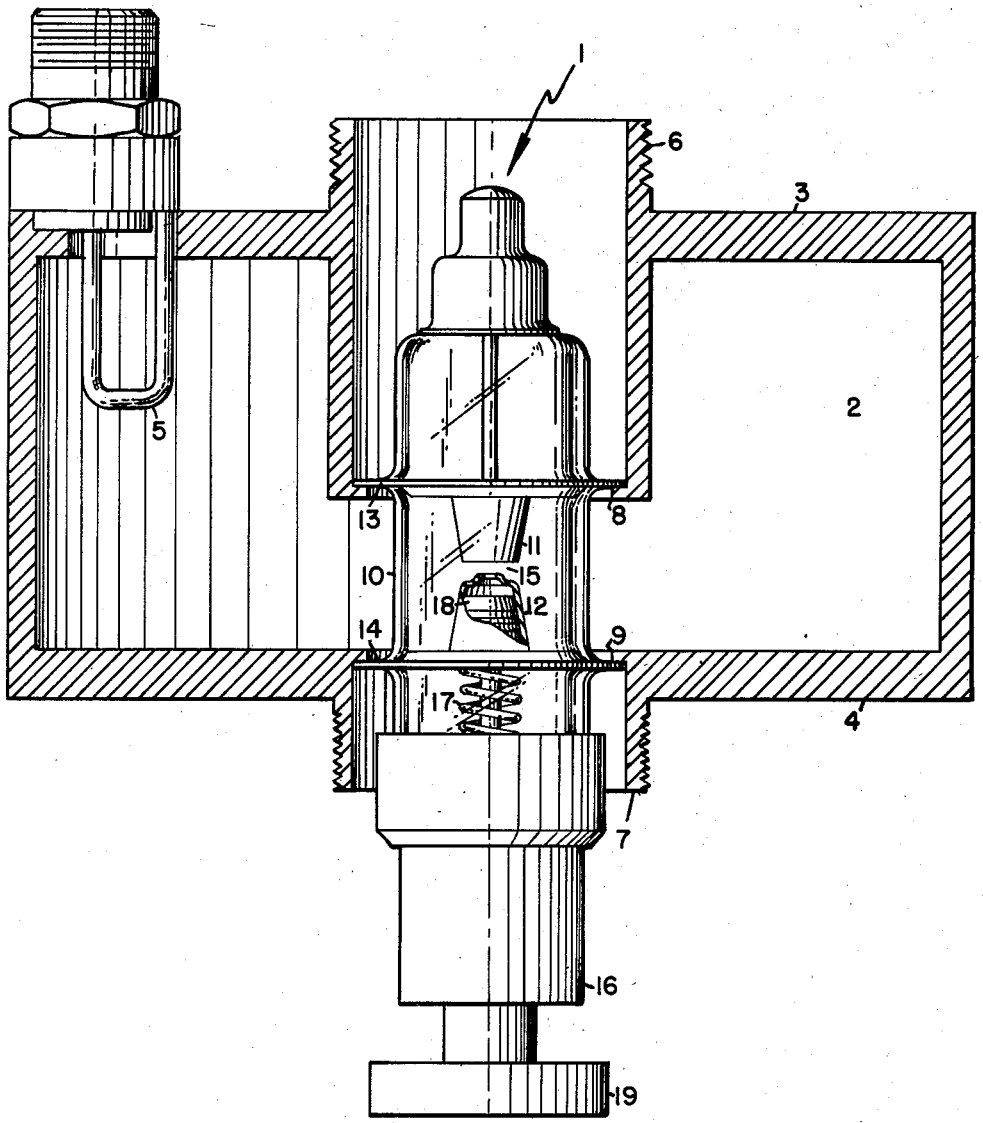
Fig. 1 is an elevation of an illustrative embodiment mounted in a cavity, shown partly in section.

Referring to Fig. 1, there is illustrated an embodiment of a cell type transmit receive tube shown generally at 1. The tube is mounted axially in a cylindrical resonant cavity 2 having end wall members 3 and 4. An output coupling loop 5 provides means for transmitting energy from the cavity to the receiver. Wall members 3 and 4 are provided with circular sleeves 6 and 7 with indented shoulders 8 and 9 for positioning of the tube in the cavity.

The embodiment of the invention has a dielectric envelope 10, filled with an ionizable gas atmosphere, and has hermetically sealed thereto at intermediate points electrodes 11 and 12. The electrodes are generally of frusto-conical shape and are provided with a thin disc at one end with a portion of the disc projecting through the envelope as at 13 and 14. When inserted in the cavity the discs contact shoulders 8 and 9 to form the composite resonant circuit. A discharge gap 15 is provided by the spacing of the electrodes 11 and 12. This spacing is adjusted by means of a differential tuning mechanism within housing 16 set at one end of envelope 10. A spring 17 and a tuning stud 18 in register with electrode 12 are controlled by knob 19 to adjust the travel of this electrode in relation to the fixed electrode 11.

Figure 2:
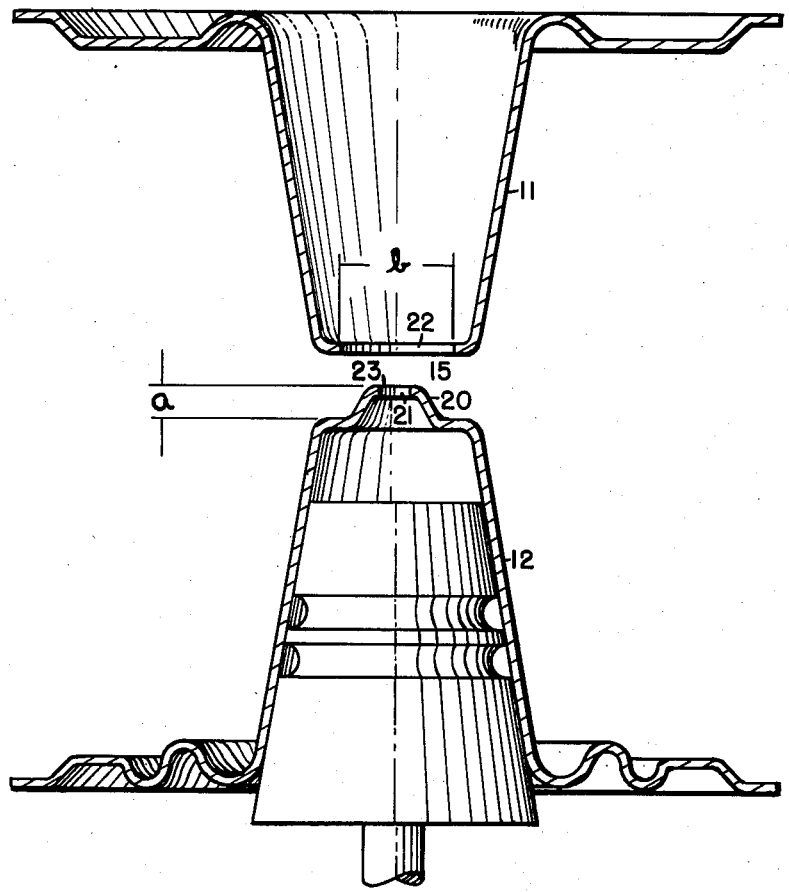
Fig. 2 is an enlarged cross sectional view of the electrode structure of the invention.

The improved electrode structure is shown in detail in Fig. 2. Electrode 12 is provided with a spherical extension 20 centrally positioned and enclosing the convergent end of the electrode. A hole 21 may be provided in this extension to facilitate cleaning and jigging in the manufacture of the tube. Electrode 11 has a substantially open tip 22 at its apex. Spacing between the electrodes defines a capacitive discharge gap 15. The dimensions of the gap 15 determine the resonant frequency of operation. Lower frequencies are attained by closer spacing of the electrodes. As the distance is decreased, however, it is extremely difficult to alter the capacitance of the gap because of the physical limitations of alignment, parallelism of the cone tips, and the possibility of shorting the electrodes, thereby destroying their usefulness.

Figure 3:
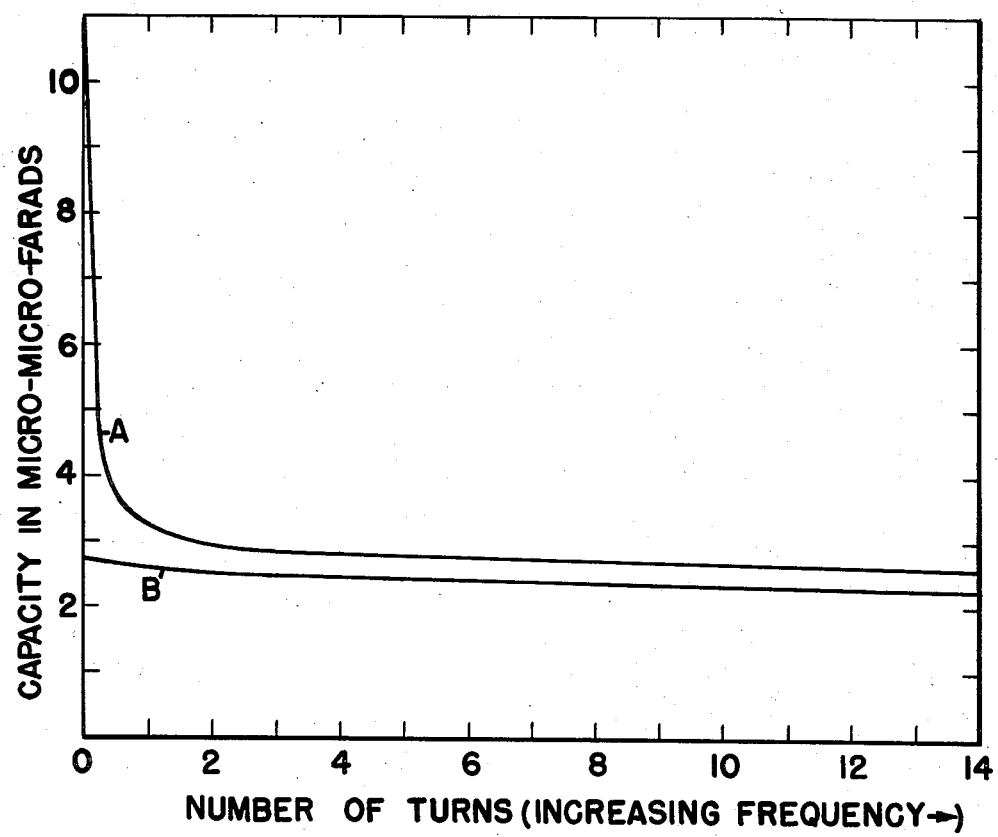
Fig. 3 is a curve illustrating the capacity of the gap structure versus number of turns of the tuning mechanism.

I have found that by providing the spherical extension 20, the capacitance may be increased sufficiently to make it possible to reach lower frequencies without the attendant disadvantages of prior art devices. In an illustrative embodiment dimension ($a$) was .016" and dimension ($b$) was .090". It will be noted that the tip of the extension is blunted as at 23. As the electrode spacing is decreased, extension 20 penetrates the field of electrode 11 by entering the open end 22. Results of this invention will be appreciated by reference to Figs. 3 and 4 which illustrate performance measurements.

Curve A is a plot of the capacity of the improved discharge gap structure as compared to number of turns of the tuning mechanism. Curve B illustrates measurements taken with prior art electrode structure. It may be noted that below two turns of the tuning mechanism when the gap spacing is extremely critical, the capacitance of the improved electrode increases to approximately 11 micro-micro-farads.

Figure 4:
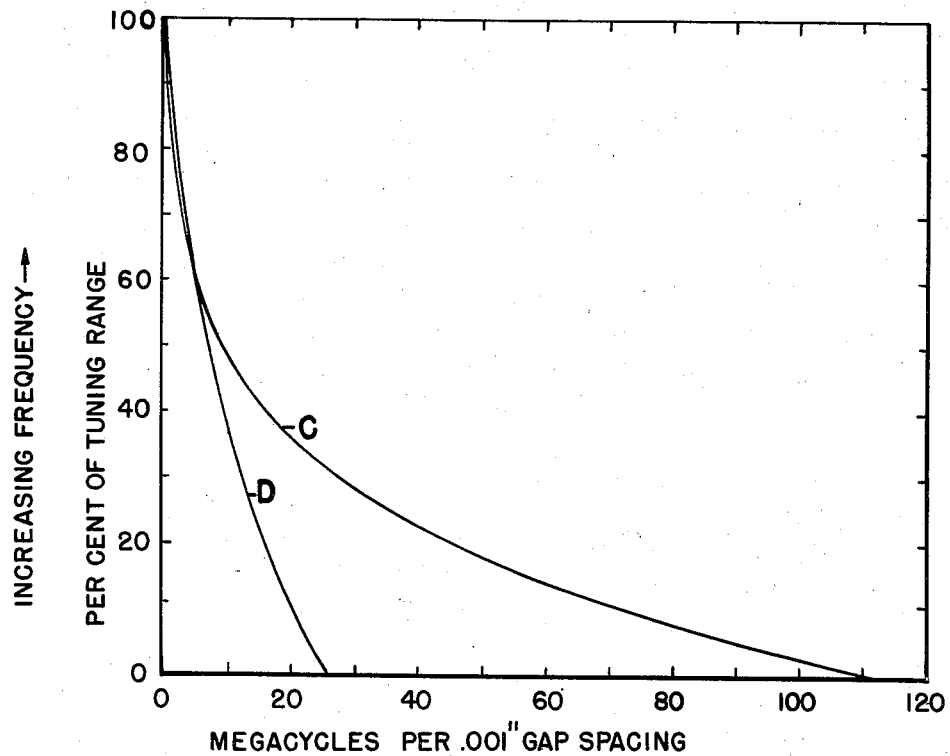
Fig. 4 is a curve of results obtained with the improved electrode structure in terms of frequency per thousandths inch gap spacings.

The results of my invention will be more readily appreciated by referring to Fig. 4. The measurements have been recorded in terms of number of megacycles frequency change per .001" gap spacing at a specific point on the tuning curve, referred to in terms of percent of tuning range. For the purpose of this specification the term "percent of tuning range" means the relationship of X number of megacycles above the lowest frequency point to the total frequency range. For a tube having a range of 200 megacycles from 1150 to 1350 megacycles, the 40% point would fall around 1230 megacycles, or 80 megacycles above the low point of 1150 megacycles.

Curve C is illustrative of the difficulties in tuning prior art tubes with accuracy at the lower frequencies. This curve shows that a noticeable difficulty in performance occurs at the 50% level. This trend increases sharply until, at the 10% level a difference of 50 megacycles per .001" gap spacing exists. Such a variance when considered with the fact that one turn of the tuning mechanism alters the gap spacing .0045" can seriously hamper performance of the tube.

The results of my invention will be readily appreciated by the trained technicians operating the radar system in which the tunable transmit receive tube is one of the essential components in adjusting the performance of the system at the resonant frequencies. Extreme care is necessary when adjusting gap dimensions to the lower frequencies of operation. Present devices may have an error as high as 200 megacycles when a miscalculation of one turn results in a .0045 difference in gap spacing. The improvement, described herein, with results plotted in Curve D reduces the tuning susceptibility to 20 megacycles per .001" gap spacing, or only a 90 megacycle error in a one turn miscalculation. Under the extreme conditions that military use imposes on radar systems such an improvement in accuracy of performance offers many advantages.

While the invention has been described with reference to an L-band transmit receive tube, it must be pointed out that its teachings in increasing capacitance of the discharge gap may be practiced on various embodiments and modifications of similar devices for use at other frequencies of operation. It is, therefore, my intention to cover in the appended claim all such alterations and modifications as fall within the true spirit and scope of this invention.

What is claimed is:

A transmit-receive tube comprising an envelope of a dielectric material, a pair of opposed hollow frusto-conical electrodes sealed in spaced relationship and axial alignment at intermediate portions of said envelope defining therebetween a capacitive discharge gap, each of said electrodes having a large disc formed at one end with a portion of the outer periphery of said disc extending through said envelope, at least one of said electrodes being axially adjustable, said adjustable electrode having a spherical extension of reduced cross section enclosing the end thereof, the opposed electrode having an open tip portion, said spherical extension having a diameter less than the diameter of the opening in the tip of said opposed electrode.

References Cited in the file of this patent

UNITED STATES PATENTS

| | | |
|---|---|---|
| 2,404,116 | Wolowicz | July 16, 1946 |
| 2,415,962 | Okress | Feb. 18, 1947 |
| 2,427,089 | Clifford | Sept. 9, 1947 |
| 2,454,761 | Barrow et al. | Nov. 30, 1948 |
| 2,491,971 | Hall et al. | Dec. 20, 1949 |
| 2,526,911 | Stone | Oct. 24, 1950 |
| 2,706,263 | Anderson | Apr. 12, 1955 |
| 2,801,392 | Booth | July 30, 1957 |

FOREIGN PATENTS

| | | |
|---|---|---|
| 579,988 | Great Britain | Aug. 22, 1946 |